United States Patent
Hayes et al.

(10) Patent No.: US 8,907,776 B2
(45) Date of Patent: Dec. 9, 2014

(54) METHOD AND APPARATUS FOR DO NOT DISTURB MESSAGE DELIVERY

(75) Inventors: David Hayes, Northville, MI (US); Thanh Duc Pham, Canton, MI (US); Jesus Cardoso, Allen Park, MI (US); Jason C. Marcath, Dearborn, MI (US); Darko Acevski, Sterling Heights, MI (US); Karin Lovett, Novi, MI (US); Hsiao-An Hsieh, Troy, MI (US); Beth Ann Dalrymple, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 424 days.

(21) Appl. No.: 13/253,230

(22) Filed: Oct. 5, 2011

(65) Prior Publication Data
US 2013/0088347 A1   Apr. 11, 2013

(51) Int. Cl.
*B60Q 1/00*   (2006.01)
*H04L 12/18*   (2006.01)
*H04W 4/04*   (2009.01)
*H04L 29/08*   (2006.01)
*H04W 4/12*   (2009.01)
*H04M 3/42*   (2006.01)
*H04L 12/58*   (2006.01)

(52) U.S. Cl.
CPC ............ *H04W 4/12* (2013.01); *H04M 3/42365* (2013.01); *H04L 12/1895* (2013.01); *H04M 3/42348* (2013.01); *H04W 4/046* (2013.01); *H04L 67/24* (2013.01); *H04L 12/5895* (2013.01); *H04L 67/12* (2013.01)
USPC ....................................... 340/455

(58) Field of Classification Search
USPC ................. 340/455, 309.7, 457, 426.15, 438; 701/22; 320/132
See application file for complete search history.

(56) References Cited

U.S. PATENT DOCUMENTS

| | | | |
|---|---|---|---|
| 5,202,617 | A | 4/1993 | Nor |
| 5,301,113 | A | 4/1994 | To et al. |
| 5,539,399 | A | 7/1996 | Takahira et al. |
| 5,686,895 | A | 11/1997 | Nakai et al. |
| 5,790,976 | A | 8/1998 | Boll et al. |

(Continued)

FOREIGN PATENT DOCUMENTS

| | | |
|---|---|---|
| EP | 2102598 | 1/2013 |
| WO | 2009071364 A1 | 6/2009 |

(Continued)

OTHER PUBLICATIONS

News Release, "Chevrolet and OnStar Give Volt Owners 24/7 Connection and Control via Wireless Smartphone Application", released Jan. 5, 2010.

(Continued)

*Primary Examiner* — Phung Nguyen
(74) *Attorney, Agent, or Firm* — Jennifer M. Stec; Brooks Kushman P.C.

(57) ABSTRACT

A computer implemented method includes detecting a vehicle state for which a user is to be notified. The method also includes sending a notification for a user regarding the vehicle state. The method further includes receiving a response that a do not disturb mode is enabled for the user. The method additionally includes queuing the notification for later delivery. The method also includes re-sending the notification for the user at a later point in time than when an original notification was sent.

4 Claims, 2 Drawing Sheets

(56) References Cited

U.S. PATENT DOCUMENTS

| | | | |
|---|---|---|---|
| 5,892,346 A | 4/1999 | Moroto et al. | |
| 5,913,917 A | 6/1999 | Murphy | |
| 5,916,298 A | 6/1999 | Kroiss et al. | |
| 6,198,995 B1 | 3/2001 | Settles et al. | |
| 6,337,621 B1 | 1/2002 | Ogino et al. | |
| 6,591,185 B1 | 7/2003 | Polidi et al. | |
| 6,836,728 B2 | 12/2004 | Shimabara | |
| 6,864,807 B2 | 3/2005 | Todoriki et al. | |
| 6,947,732 B2 | 9/2005 | Fraser | |
| 7,127,350 B2 | 10/2006 | Oikubo | |
| 7,142,664 B2 | 11/2006 | Seligmann | |
| 7,149,623 B2 | 12/2006 | Flick | |
| 7,277,780 B2 | 10/2007 | Meier-Arendt et al. | |
| 7,346,630 B2 | 3/2008 | Eichstaedt et al. | |
| 7,402,978 B2 | 7/2008 | Pryor | |
| 7,433,714 B2 | 10/2008 | Howard et al. | |
| 7,444,384 B2 | 10/2008 | Horvitz | |
| 7,586,956 B1 | 9/2009 | Mishra et al. | |
| 7,668,644 B2 | 2/2010 | Tengler et al. | |
| 7,873,466 B2 | 1/2011 | Kong | |
| 7,925,426 B2 | 4/2011 | Koebler et al. | |
| 8,000,842 B2 | 8/2011 | Yi et al. | |
| 8,005,453 B2 | 8/2011 | Van Bosch et al. | |
| 8,103,434 B2 | 1/2012 | Helbing et al. | |
| 8,239,127 B2 | 8/2012 | Kono et al. | |
| 8,255,152 B2 | 8/2012 | Barth et al. | |
| 8,284,039 B2 | 10/2012 | Baker et al. | |
| 8,290,695 B2 | 10/2012 | Hiestermann et al. | |
| 8,290,701 B2 | 10/2012 | Mason et al. | |
| 8,294,286 B2 | 10/2012 | Hunter | |
| 8,401,792 B2 | 3/2013 | Yeh et al. | |
| 8,478,642 B2 | 7/2013 | Dey et al. | |
| 8,504,236 B2 | 8/2013 | Guo et al. | |
| 2002/0164998 A1 | 11/2002 | Younis | |
| 2003/0023374 A1 | 1/2003 | Shimabara | |
| 2004/0073643 A1 | 4/2004 | Hayes et al. | |
| 2004/0162669 A1 | 8/2004 | Nagamasa | |
| 2004/0243307 A1 | 12/2004 | Geelen | |
| 2005/0080552 A1 | 4/2005 | Feldman et al. | |
| 2006/0002413 A1* | 1/2006 | Tsutazawa et al. | 370/412 |
| 2006/0007022 A1 | 1/2006 | Endo et al. | |
| 2006/0290490 A1 | 12/2006 | Kraus et al. | |
| 2007/0052552 A1 | 3/2007 | Suzuki | |
| 2007/0112475 A1 | 5/2007 | Koebler et al. | |
| 2007/0150171 A1 | 6/2007 | Tengler et al. | |
| 2007/0271035 A1 | 11/2007 | Stoschek et al. | |
| 2008/0027606 A1 | 1/2008 | Helm | |
| 2008/0042489 A1 | 2/2008 | Lewis et al. | |
| 2009/0021218 A1* | 1/2009 | Kelty et al. | 320/137 |
| 2009/0099992 A1 | 4/2009 | Horvitz | |
| 2009/0110163 A1 | 4/2009 | Gupta | |
| 2009/0119385 A1* | 5/2009 | Horvitz | 709/207 |
| 2009/0138188 A1 | 5/2009 | Kores et al. | |
| 2009/0141173 A1 | 6/2009 | Pugel | |
| 2009/0265099 A1 | 10/2009 | Gottlieb | |
| 2009/0309709 A1 | 12/2009 | Bevacqua et al. | |
| 2010/0017249 A1 | 1/2010 | Fincham et al. | |
| 2010/0060016 A1 | 3/2010 | Hunter | |
| 2010/0070253 A1 | 3/2010 | Hirata et al. | |
| 2010/0076675 A1 | 3/2010 | Barth et al. | |
| 2010/0094496 A1 | 4/2010 | Hershkovitz et al. | |
| 2010/0106514 A1 | 4/2010 | Cox | |
| 2010/0106603 A1 | 4/2010 | Dey et al. | |
| 2010/0110077 A1 | 5/2010 | Grossman et al. | |
| 2010/0131188 A1 | 5/2010 | Yeh et al. | |
| 2010/0138142 A1 | 6/2010 | Pease | |
| 2010/0169008 A1 | 7/2010 | Niwa et al. | |
| 2010/0207772 A1 | 8/2010 | Yamamoto | |
| 2010/0235076 A1 | 9/2010 | Ofek et al. | |
| 2010/0237985 A1 | 9/2010 | Landau-Holdsworth et al. | |
| 2010/0256830 A1 | 10/2010 | Kressner et al. | |
| 2010/0274689 A1 | 10/2010 | Hammad et al. | |
| 2010/0286909 A1 | 11/2010 | Tate, Jr. et al. | |
| 2011/0040438 A1 | 2/2011 | Kluge et al. | |
| 2011/0060495 A1 | 3/2011 | Kono et al. | |
| 2011/0060517 A1 | 3/2011 | Kono et al. | |
| 2011/0191265 A1 | 8/2011 | Lowenthal et al. | |
| 2011/0224841 A1 | 9/2011 | Profitt-Brown et al. | |
| 2011/0224852 A1 | 9/2011 | Profitt-Brown et al. | |
| 2011/0225105 A1 | 9/2011 | Scholer et al. | |
| 2011/0238457 A1 | 9/2011 | Mason et al. | |
| 2011/0251789 A1 | 10/2011 | Sanders et al. | |
| 2011/0307166 A1 | 12/2011 | Hiestermann et al. | |
| 2011/0309926 A1 | 12/2011 | Eikelenberg et al. | |
| 2012/0016551 A1* | 1/2012 | Krause et al. | 701/29 |
| 2012/0016576 A1 | 1/2012 | Huang et al. | |
| 2012/0022904 A1 | 1/2012 | Mason et al. | |
| 2012/0029800 A1 | 2/2012 | Kluge et al. | |
| 2012/0065831 A1* | 3/2012 | Ross et al. | 701/29.1 |
| 2012/0158299 A1 | 6/2012 | Cerecke et al. | |
| 2012/0179315 A1 | 7/2012 | Tate et al. | |
| 2012/0179362 A1 | 7/2012 | Stille | |
| 2012/0232783 A1 | 9/2012 | Calkins et al. | |
| 2012/0271542 A1 | 10/2012 | Arcot et al. | |

FOREIGN PATENT DOCUMENTS

| | | |
|---|---|---|
| WO | 2009071369 A1 | 6/2009 |
| WO | 2011003813 | 1/2011 |
| WO | 2011021776 A2 | 2/2011 |
| WO | 2011035427 A1 | 3/2011 |

OTHER PUBLICATIONS

Josie Garthwaite, "GM's Volt to Launch With Cell Phone App for Remote Control", Jan. 6, 2010, printed from http:/gigaom.com/cleantech/gms-volt-to-launch-with-cell-phone-app-for-remote-control/, Dec. 30, 2010.

GM Onstar Mobile Demonstration Capability for Volt img. retrieved from: Hayes, JW, "GM OnStar App for Chevy Volt". Auto and Racing News, Jan. 6, 2010. <http://autoandracingnews.wordpress.com/2010/01/06/gm-onstar-app-for-chevy-volt/>.

BlackBerry Curve Series, BlackBerry Curve 9300/9330—Smartphones User Guide, Version: 6.0 (2011), pp. 144.

BlackBerry Curve Series, BlackBerry Curve 9300/9330—Smartphones User Guide, Version: 6.0 (2011).

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

* cited by examiner

METHOD AND APPARATUS FOR DO NOT DISTURB MESSAGE DELIVERY

TECHNICAL FIELD

The illustrative embodiments generally relate to a method and apparatus for do not disturb message delivery.

BACKGROUND

The integration of computing systems into vehicles has provided modern vehicles that are ever increasing in "smart" capability. Programmable vehicle systems provide a customizable vehicle environment, and on-board technology can easily provide a driver with navigation, entertainment and fuel optimization options.

Additionally, cellular phone integration and compatibility has lead to the opportunity for drivers to receive calls in a vehicle. These calls can be handled by a vehicle system, and are often done so in a hands free manner. Of course, since drivers do not always want to be disturbed during a drive, it may be possible to set a do not disturb feature that blocks calls when enabled, or when certain conditions are met.

In addition to integrating with phone technology while the driver is in a vehicle, a secondary concept of phone integration has also arisen. Since vehicle computing systems can have an embedded phone or other transmission device included therewith (e.g., without limitation, WiFi, ZigBee, etc.), it may be possible for a vehicle to actually contact a cellular phone, computer, etc. while the driver is away from the vehicle.

The ability for a vehicle to contact an owner has numerous applications. On a hot day, an owner can be notified if a vehicle interior temperature rises above a certain point, and remote HVAC may be enabled to cool the vehicle. Drivers can also be notified if an attempt is made to breach the security of a vehicle, or, for example, if a vehicle is being moved/towed.

Numerous alerts are possible in a vehicle-to-phone environment, and can be provided such that a driver is kept up to date on a state of the vehicle while the driver is away. Of course, just as a driver does not always want to be disturbed while driving, a driver similarly may not want an alert that the vehicle has risen above a certain temperature if the driver is in an important business meeting.

SUMMARY

In a first illustrative embodiment, a computer implemented method includes detecting a vehicle state for which a user is to be notified. The method also includes sending a notification for a user regarding the vehicle state. The method further includes receiving a response that a do not disturb mode is enabled for the user. The method additionally includes queuing the notification for later delivery. The method also includes re-sending the notification for the user at a later point in time than when an original notification was sent.

In a second illustrative embodiment, a computer implemented method includes receiving a notification from a vehicle computing system relating to a vehicle state and determining that a do not disturb function is enabled. The method also includes determining whether the notification is eligible to ignore the do not disturb state. The method further includes queuing the notification for later delivery if the notification is not eligible to ignore the do not disturb state. The method additionally includes delivering the queued notification once the do not disturb state has ended.

In a third illustrative embodiment, a machine readable storage medium stores instructions that, when executed by a processor, causes the processor to perform the method including detecting a vehicle state for which a user is to be notified. The method additionally includes sending a notification for a user regarding the vehicle state and receiving a response that a do not disturb mode is enabled for the user. The method also includes queuing the notification for later delivery. Also, the method includes re-sending the notification for the user at a later point in time than when an original notification was sent.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
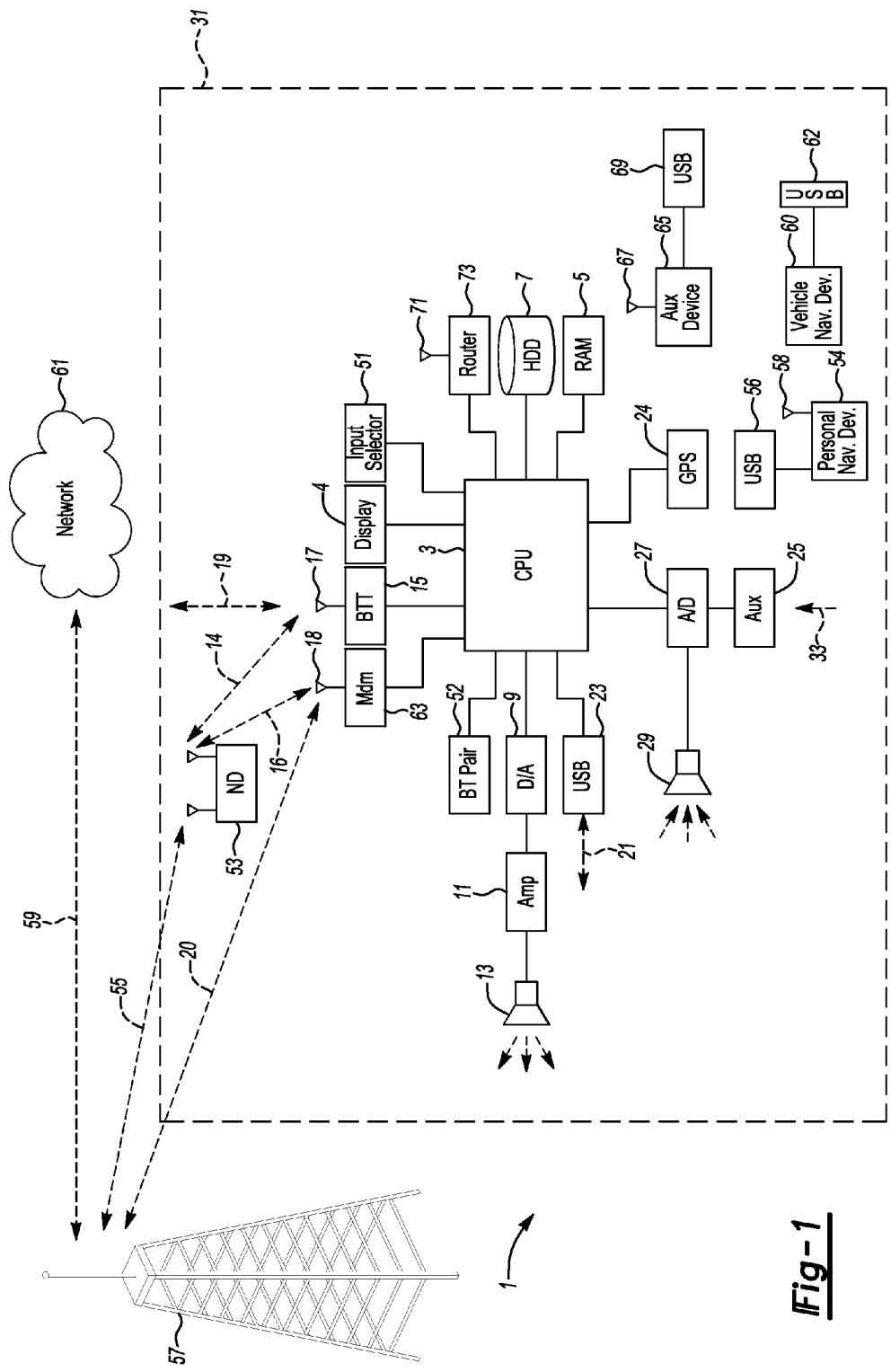
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen.

In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9.

Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Recent studies have shown that a large point of concern with hybrid, plug-in and battery electric vehicles (HEVs, PHEVs, and BEVs) is the range and charge state of the vehicle. This can largely be attributed to the charging times associated with fully charging a vehicle. Unlike gasoline powered vehicles, which can be refueled in a matter of minutes, electric vehicles (EVs) can take a significantly longer time to recharge.

Typically, this does not present a problem for an average commuter, as the vehicle can be charged overnight, and then driven as needed the following day. As long as the user remembers to charge the vehicle, there should be no problem obtaining sufficient charge for activities on a day to day basis.

Sometimes, however, the user may forget to plug in the vehicle, or, for example, the vehicle may become unplugged. In other cases, the user may wish to know when a vehicle is fully charged, so that a plug can be removed or used for a second vehicle. Accordingly, with the integration of communication devices into vehicle computing systems, it has become possible for a vehicle to actively notify an owner when a condition relating to charge, for example, has been met.

Since vehicle computing systems can be provided with a limited "intelligence," it could be possible, for example, for a vehicle to "realize" that an owner typically uses a vehicle between six and seven A.M. on a weekday. If, at some point reasonably before this time, the vehicle detects that it has not been plugged in and/or does not have a threshold level of charge, a user may be notified that the charging event has not occurred. One way to notify a user is to send a message to the user's cellular phone.

In another example, a user may wish only to charge a vehicle to a certain point (to save on electricity costs, for example). In this case, the vehicle may notify a user when a certain charge has been reached. The user could then unplug the vehicle, leave the vehicle plugged in, or even send instructions to a vehicle to cease charging.

In still a further example, a user may wish to know when a vehicle is fully charged. Since it could be a nuisance to have to periodically go out to the vehicle and check a charge state, the vehicle could be configured to inform a user when a full charge state has been reached. Multiple other events related to charging and other vehicle states are also contemplated within the scope of this invention.

Although it is generally convenient to have the capability for a vehicle to notify a user when a charging condition has been met, there are certainly times when a user may not wish to be disturbed. For example, a user may not wish to be woken up at 2 AM to be notified that a vehicle is fully charged. Accordingly, it is possible for a user to enable a do not disturb feature on the vehicle computer, on a cellular application, or on a remote network through which a notification may pass.

Unfortunately, if a notification system is not selectively enabled (i.e., if all notifications are blocked), a user may miss an important event. For example, if a user really needs a night's sleep, or is in an important meeting, an election may be made to block all notifications for a selective time period. While it may not be critical to the user to be notified that a vehicle is fully charged, if, for example, a vehicle was unplugged, or a power outage occurred and the vehicle was not charging, the user may return to the vehicle unaware that charging had been interrupted and discover that insufficient charge remains in the vehicle to provide for a desired travel distance.

To address this potential situation, the illustrative embodiments contemplate a solution that enables queuing and delivery of events occurring during a do not disturb period, once that period has ended.

Figure 2:
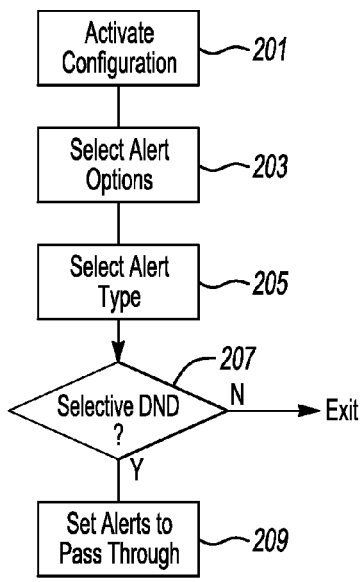
FIG. 2 shows an illustrative configuration process.

FIG. 2 shows an illustrative configuration process. This process allows a user to select what events will result in notification to a user's device. Since there could literally be hundreds of events of which a particular user could be notified, it may be desirable to allow some selectivity in the process.

In this example, a configuration protocol is activated. This configuration can occur, for example, on a cellular phone, on a vehicle computing system, or on a remote site that controls event notification.

In one example, the process occurs on an application provided to a wireless device. The application can act as a gatekeeper for notification, and can provide a comprehensive listing of all possible notification events. The user can elect events for which notification is desired, and the application can save a listing of the elected events.

In one embodiment, a vehicle system can send all events to the wireless device, and the active application can filter the presented events down to those which the user has elected. Certain events may also be deemed "critical," and can override the notification selection and always be presented to the user.

In another embodiment, the application can serve as a configuration utility as opposed to a gatekeeper, and, once event configuration has been elected, the device can transfer the settings to a vehicle computing system.

In another example, the user can directly interface with a vehicle computing system to select notification events. Again, in this example, the vehicle computing system can serve as the gatekeeper and the selection of events can result in a general block/pass-through configuration that only allows selective event delivery.

Similar to the situation with the wireless device acting as a configuration utility, the vehicle system can pass a configuration to a wireless device application once set, if the wireless device is to act as the gatekeeper. Additionally or alternatively, either medium can be used to set events (or receive settings from) a remote source, if events pass through a controllable server before arriving at a wireless device.

In remote server alternative, the server can provide a configuration and/or gatekeeper functionality as well, and may be configurable from, for example a website. In at least one embodiment, a user may use a website to configure notification, and then, when entering and powering the vehicle, the data from the website may be distributed to the wireless device and/or the vehicle computing system (in communication with the server through the wireless device). In this manner, configuration and/or gatekeeping functionality may be determined at any one of numerous points and/or transferred to other points in a system as necessary.

In the configuration process shown in FIG. 2, a configuration utility is launched by a user 201. A configuration utility may be useful in an instance where event notification is not preset by a manufacturer and is non-user configurable.

The user is then given an option to select alert options 205. Selection of options can include, but is not limited to, selection of option type (e.g., text, email, phone call, etc.), selection of type of do not disturb (full block, critical alert passthrough, selective do not disturb, etc.), etc.

If, for example, selection of do not disturb configuration is chosen, the user may set times or conditions for do not disturb enablement. Additionally or alternatively, the user can enable "full" do not disturb at certain times, and selective do not disturb at other times.

In this example, a user is given the option to select particular alerts 205. Since a myriad of alerts may be available for selection, a user may wish to configure and select only a subset of these alerts. In another example, a user may configure which alerts have priority as pass-through alerts, such that critical alerts ignore a do not disturb feature.

If selective do not disturb has been enabled for at least some period of time 207, the user may additionally be given an option to call out chosen alerts for passthrough 209. For example, if a user elected to be notified of an unplugged event, a fully charged event and a security-breach event, the user may then decide to always be notified of a security breach, to sometimes be notified of an unplugged event (but not, perhaps, at 2 AM), and to only be notified of a fully charged event if do not disturbed is disengaged.

Figure 3:
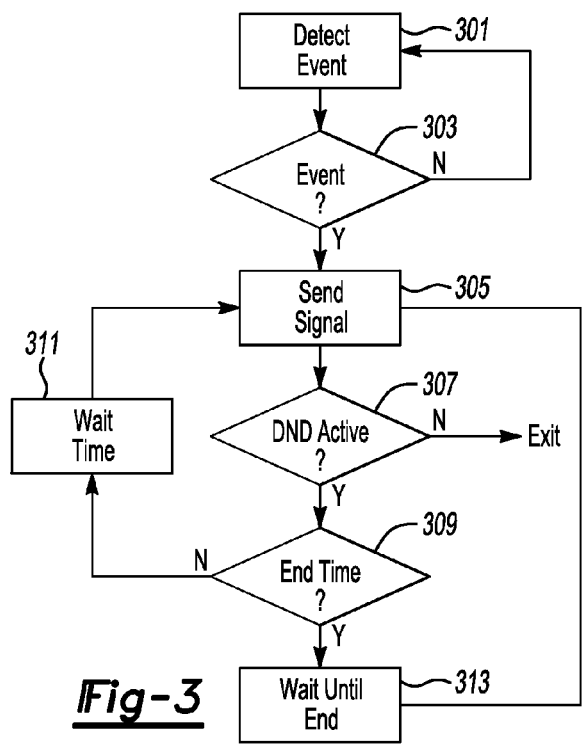
FIG. 3 shows an illustrative event queuing process.

FIG. 3 shows an illustrative event queuing process. Since certain events may be blocked during do not disturb periods, it may be desirable to notify a user of these events once a do not disturb period is over. In this example, the wireless device acts as the do not disturb gatekeeper, and the vehicle computing system acts as the queuing and notification delivery system. Various illustrative embodiments will be described herein where different systems perform varying roles, but it is understood that most, if not all, of these roles are interchangeable and such interchangeability is contemplated within the scope of the invention.

In this example, the vehicle computing system (VCS) detects the occurrence of an event 301. In one case, the event may be any event available for notification, in another example the event may correspond to one or more events selected for notification (i.e., the system will ignore non-selected events).

In this illustrative embodiment, for the sake of example, it is assumed that the event corresponds to any event available for notification. If the event also qualifies as a selected event 303, the VCS will send a notification signal to a wireless device designated for notification 305. Additionally or alternatively, the notification signal can be sent to a remote server designated to notify a wireless device or other notification medium.

If do not disturb (DND) is not active 307, the message will be delivered as sent, and the vehicle owner will receive the sent notice. If, however, do not disturb is active, the process will determine if there is an end-time associated with the do not disturb notification 309. Although not shown, an additional determination may be made as to whether or not the event qualifies for passthrough.

If there is not a selected end time associated with the do not disturb feature (e.g., the user has simply randomly enabled do not disturb, as opposed to a do not disturb period having been set), the system may wait a selected period of time 311 and then attempt to send the signal again. It is also possible, for example, that during this period of time a second event has occurred, so that multiple events will back up and queue for delivery once the do not disturb period is over.

If there is a particular end time associated with a do not disturb state, the system will wait at least until that time, and then attempt to send the notification(s) 313. Since the user may have re-enabled do not disturb at the expiration of the previous period, the system, in this embodiment, will again check to see if do not disturb is active before delivering the notifications.

Figure 4:
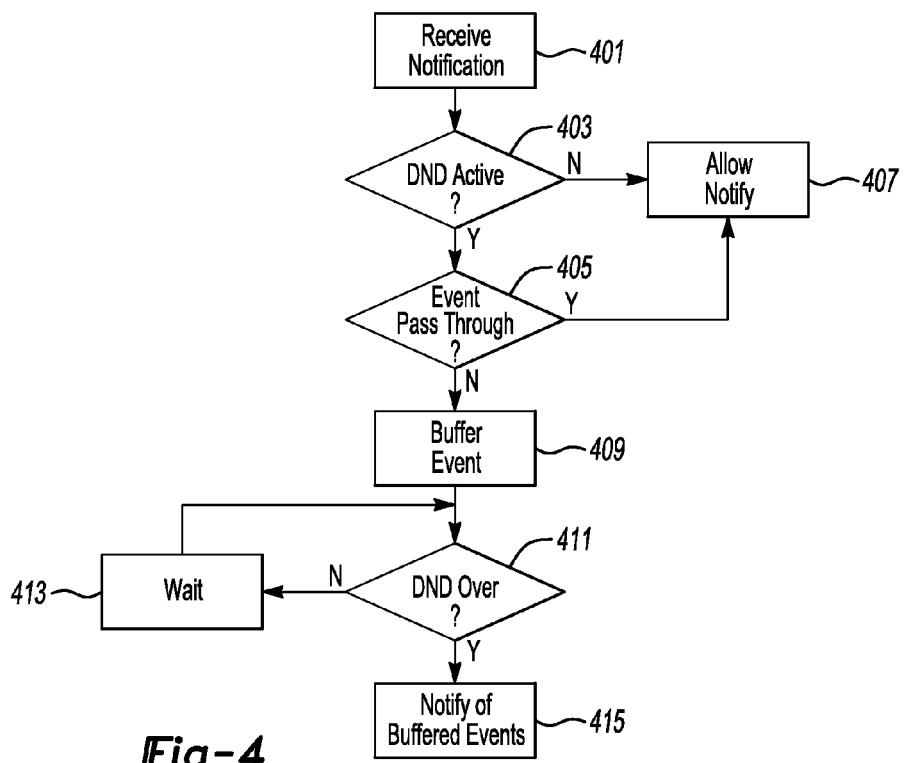
FIG. 4 shows a second illustrative event queuing process.

FIG. 4 shows a second illustrative event queuing process. In this example, an application running on the phone acts as both the queuing mechanism and gatekeeper. Additionally or alternatively, a similar process could be running on a remote server, with the server acting as the queuing mechanism and gatekeeper. Or, a software module running on a VCS could serve the functionality shown in FIG. 4.

In this example, the process receives a notification of an event to be broadcast to a user 401. The process checks to see if the do not disturb feature is active 403, and, if not active, the process allows the notification to be delivered 407.

Also, in this example, a passthrough feature is enabled, such that if the event qualifies as an event that is to be passed through 405, the process allows the notification 407 to occur. Passthough, as previously noted, can be automatically enabled for certain critical events (e.g., theft) and/or selectively enabled based on user priorities.

If the event does not qualify for passthrough and if do not disturb is enabled, the process may then buffer the event 409 to be delivered at a later point in time when do not disturb is not active. The process may periodically determine if the do not disturb period has ended 411, and, if it has not, wait for some period of time 413 and then check again.

Once the period has ended, the process may notify a user of events that have been buffered which were blocked by the do not disturb feature 415.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer implemented method comprising:
receiving a notification from a vehicle computing system relating to a vehicle state;
determining that a do not disturb function is enabled;
determining whether the notification is eligible to ignore the do not disturb state;
queuing the notification for later delivery if the notification is not eligible to ignore the do not disturb state; and
delivering the queued notification once the do not disturb state has ended.

2. The method of claim 1, wherein the vehicle state is a charging ended state.

3. The method of claim 1, wherein the vehicle state is a charging interrupted state.

4. The method of claim 1, wherein eligibility for a notification to ignore the do not disturb state is set by a user.

* * * * *